US009744971B2

(12) United States Patent
Bigdelou

(10) Patent No.: US 9,744,971 B2
(45) Date of Patent: Aug. 29, 2017

(54) METHOD, SYSTEM, AND COMPUTER PROGRAM PRODUCT FOR MONITORING A DRIVER OF A VEHICLE

(71) Applicant: Bayerische Motoren Werke Aktiengesellschaft, Munich (DE)

(72) Inventor: Ali Bigdelou, Munich (DE)

(73) Assignee: Bayerische Motoren Werke Aktiengesellschaft, Munich (DE)

( * ) Notice: Subject to any disclaimer, the term of this patent is extended or adjusted under 35 U.S.C. 154(b) by 0 days.

(21) Appl. No.: 15/141,177

(22) Filed: Apr. 28, 2016

(65) Prior Publication Data
US 2016/0318520 A1 Nov. 3, 2016

(30) Foreign Application Priority Data
Apr. 29, 2015 (EP) .................................... 15165550

(51) Int. Cl.
*B60W 40/08* (2012.01)
*B60W 50/08* (2012.01)
*B60W 50/14* (2012.01)
*B60W 40/04* (2006.01)
*G08B 21/02* (2006.01)

(52) U.S. Cl.
CPC ............ *B60W 40/08* (2013.01); *B60W 40/04* (2013.01); *B60W 50/08* (2013.01); *B60W 50/14* (2013.01); *G08B 21/02* (2013.01); *B60W 2540/22* (2013.01); *B60W 2540/28* (2013.01); *B60W 2550/302* (2013.01); *B60W 2550/306* (2013.01)

(58) Field of Classification Search
None
See application file for complete search history.

(56) References Cited

U.S. PATENT DOCUMENTS

2008/0061958 A1  3/2008  Birk et al.
2011/0169625 A1* 7/2011  James ................... B60Q 9/008
                                                         340/439

(Continued)

FOREIGN PATENT DOCUMENTS

DE   10 2013 203 239 A1   8/2014
WO   WO 2014/138766 A1    9/2014

OTHER PUBLICATIONS

Extended European Search Report issued in counterpart European Application No. 15165550.3 dated Oct. 30, 2015 (five (5) pages).

*Primary Examiner* — Leon-Viet Nguyen
(74) *Attorney, Agent, or Firm* — Crowell & Moring LLP

(57) ABSTRACT

A method is provided for monitoring a driver of a vehicle, the method receives a state of the driver; receives one or more objects of a real environment model of the vehicle; generates one or more objects of an envisioned environment model of the driver based on the one or more objects of the real environment model of the vehicle and the state of the driver, wherein, if the state of the driver indicates that at least one sense of the driver sensed a particular object of the real environment model, the particular object of the real environment model is added to the envisioned environment model; and updates the one or more objects of the envisioned environment model based on the state of the driver, wherein the one or more objects of the envisioned environment model are updated by a physics engine if the state of the driver indicates that the driver is prevented from sensing the one or more objects of the real environment model.

11 Claims, 5 Drawing Sheets

(56) References Cited

U.S. PATENT DOCUMENTS

2013/0058536 A1* 3/2013 Levin .................. A61B 5/18
                                                              382/104
2016/0026181 A1    1/2016 Kopetz

* cited by examiner

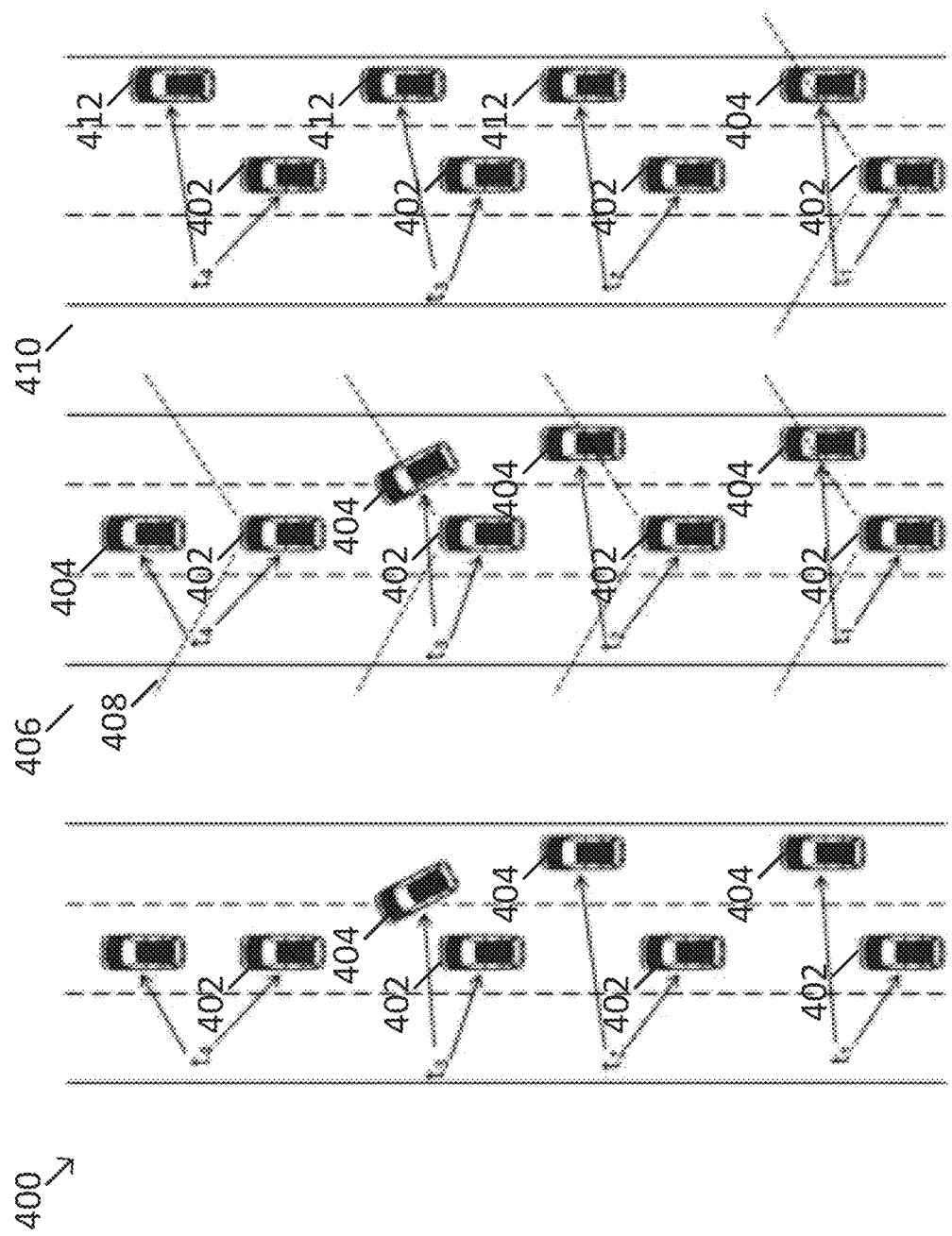

METHOD, SYSTEM, AND COMPUTER PROGRAM PRODUCT FOR MONITORING A DRIVER OF A VEHICLE

CROSS REFERENCE TO RELATED APPLICATIONS

This application claims priority under 35 U.S.C. §119 from European Patent Application No. 15 165 550.3, filed Apr. 29, 2015, the entire disclosure of which is herein expressly incorporated by reference.

BACKGROUND AND SUMMARY OF THE INVENTION

The present invention relates to the field of monitoring a driver of a vehicle. In particular, different senses of the driver may be monitored to determine the attention of the driver to the driving activity. Based on the attention of the driver, warning systems and driving assistant systems may be adapted so that the vehicle may drive autonomously as long as possible before providing a signal to the driver to take-over the driving responsibility.

Due to the ongoing development of sensors, monitoring and analyzing the inside and the outside of a vehicle may be possible. For example, cameras may be used to monitor a driver's gaze and field of view and may provide a warning if the driver's gaze might not be oriented in a forward direction.

In particular, US 2008/0061958 A1 discloses an active safety system for a vehicle including an external object sensor system arranged on a host vehicle. The sensor system may be designated to sense objects external to the host vehicle and may generate input data relating to the objects, wherein the input data may include an object position. Additionally, a threat indicator may be included to assign a threat level to each external object detected by the sensor system.

Accordingly, there may be a need for systems which efficiently improve monitoring a driver of a vehicle. In particular, there may be a need for a system which monitors the attention of the driver to the driving activity and may support the driver to take-over driving responsibility when the vehicle might not continue driving autonomously.

This need may be met by a method and system for monitoring a driver of a vehicle in accordance with embodiments of the invention.

According to a first aspect of the invention, there is provided a method for monitoring a driver of a vehicle. The method receives a state of the driver and one or more objects of a real environment model of the vehicle. One or more objects of an envisioned environment model of the driver are generated based on the one or more objects of the real environment model of the vehicle and the state of the driver, wherein, if the state of the driver indicates that at least one sense of the driver sensed a particular object of the real environment model, the particular object of the real environment model is added to the envisioned environment model. And, the one or more objects of the envisioned environment model are updated based on the state of the driver, wherein the one or more objects of the envisioned environment model are updated by a physics engine if the state of the driver indicates that the driver is prevented from sensing the one or more objects of the real environment model. This may provide the advantage that the envisioned environment model of the driver may efficiently predict the movement of objects even if the driver does not receive any new information via at least one sense of his senses. Accordingly, a more precise model of the environment may be created from a driver's point of view. More specifically, the environment of the driver may be monitored more efficiently based on the state of the driver.

According to an embodiment of the invention, the generating of the one or more objects of the envisioned environment model may further comprise that a corresponding object of the particular object is found in the envisioned environment model. Next it may be determined whether the driver of the vehicle has received information about the particular object via a subset of senses of the driver, wherein the subset of senses is determined based on the state of the driver. Further, the corresponding object of the envisioned environment model may be updated with data of the particular object based on the subset of senses, if the corresponding object exists in the envisioned environment model and the driver has received information about the particular object via a subset of senses. This may provide the advantage that any sense of the driver may be used to receive information. In particular, only the information of an object of the real information model related to a particular sense or a subset of senses may be included in the envisioned environment model. Accordingly, the envisioned environment model may be efficiently created based on data from different senses.

According to a further embodiment of the invention, the method may further comprise that a deviation factor may be computed between the particular object of the real environment model and the corresponding object of the envisioned environment model. This may provide the advantage that a deviation of the driver's environment and the real environment may be determined at any time by a simple comparison of the envisioned environment model and the real environment model. Thus, a fast response to any deviations may be enabled.

According to a further embodiment of the invention, the deviation factor may comprise a deviation of at least one of position, speed, and acceleration between the particular object of the real environment model and the corresponding object of the envisioned environment model. By comparing each pair of objects of the real environment model and the envisioned environment model, the deviation may be efficiently computed.

According to a further embodiment of the invention, the deviation of the position may comprise a weighted deviation of the position, wherein the deviation of the speed may comprise a weighted deviation of the speed, and/or wherein the deviation of the acceleration may comprise a weighted deviation of the acceleration. By using weights when computing the deviation, the computation of the deviation factor may be efficiently adapted to different situations.

According to a further embodiment of the invention, the method may further comprise that a situation awareness factor may be calculated based on the deviation factor for the particular object of the real environment model and the corresponding object of the envisioned environment model. By calculation of the situation awareness factor, an indicator may be efficiently calculated which takes into account any deviation of some or all objects included in the environment models.

According to a further embodiment of the invention, the method may further comprise that calculating a take-over ability time based on a function of the situation awareness factor. For example, the take-over ability time may be calculated based on the reverse of the situation awareness factor. By calculating the takeover-ability time based on the situation awareness factor, the estimated time for taking over the vehicle by the driver is related to the awareness of the driver regarding the actual situation around the vehicle.

According to a further embodiment of the invention, the method may further comprise that the calculated situation awareness factor and/or the calculated take-over ability time may be provided to at least one of a warning system and a driving assistant system of the vehicle. Advantageously, the warning system and/or the driving assistant system may be enabled to efficiently adapt their functionalities to the detected situation awareness factor and/or the take-over ability time.

According to a further aspect of the invention there is provided a system for monitoring a driver of a vehicle. The system includes a processor, a memory, and instructions stored within the memory, wherein the instructions, when executed on the processor, cause the system to: receive a state of the driver, receive one or more objects of a real environment model of the vehicle, generate one or more objects of an envisioned environment model of the driver based on the one or more objects of the real environment model of the vehicle and the state of the driver. If the state of the driver indicates that at least one sense of the driver sensed a particular object of the real environment model, the particular object of the real environment model is added to the envisioned environment model. And, the one or more objects of the envisioned environment model are updated based on the state of the driver, wherein the one or more objects of the envisioned environment model are updated by a physics engine if the state of the driver indicates that the driver is prevented from sensing the one or more objects of the real environment model. This may provide the advantage that the envisioned environment model of the driver may efficiently predict the movement of objects even if the driver does not receive any new information via at least one sense of his senses. Accordingly, a more precise model of the environment may be created from a driver's point of view. More specifically, the environment of the driver may be monitored more efficiently based on the state of the driver.

According to a further aspect of the invention there is provided a computer program product for monitoring a driver of a vehicle, the computer program product, when being executed by a data processor, is adapted for controlling and/or for carrying out the method as described above.

As used herein, reference to a computer program or a computer program product is intended to be equivalent to a reference to a program element and/or to a computer readable medium containing instructions for controlling a computer system to coordinate the performance of the above described method.

The computer program may be implemented as computer readable instruction code in any suitable programming language, such as, for example, JAVA, C++, and may be stored on a computer-readable medium (removable disk, volatile or non-volatile memory, embedded memory/processor, etc.). The instruction code is operable to program a computer or any other programmable device to carry out the intended functions. The computer program may be available from a network, such as the World Wide Web, from which it may be downloaded.

The invention may be realized by means of a computer program in the form of software. However, the invention may also be realized by means of one or more specific electronic circuits, i.e. hardware. Furthermore, the invention may also be realized in a hybrid form, i.e. in a combination of software modules and hardware modules.

It has to be noted that embodiments of the invention have been described with reference to different subject matters. In particular, some embodiments have been described with reference to method type claims whereas other embodiments have been described with reference to apparatus type claims. However, a person skilled in the art will gather from the above and the following description that, unless otherwise notified, in addition to any combination of features belonging to one type of subject matter also any combination between features relating to different subject matters, in particular between features of the method type claims and features of the apparatus type claims is considered as to be disclosed with this document.

The aspects defined above and further aspects of the present invention are apparent from the examples of embodiments to be described hereinafter and are explained with reference to the examples of embodiments. The invention will be described in more detail hereinafter with reference to examples of embodiments but to which the invention is not limited.

Other objects, advantages and novel features of the present invention will become apparent from the following detailed description of one or more preferred embodiments when considered in conjunction with the accompanying drawings.

BRIEF DESCRIPTION OF THE DRAWINGS

FIG. 4A shows an exemplary real environment model of a simplified situation on a road;

FIG. 4B shows an exemplary driver model when the driver is observing the road;

FIG. 4C shows an exemplary driver model when the driver is looking to the road only at time ti.

DETAILED DESCRIPTION OF THE DRAWINGS

Figure 1:
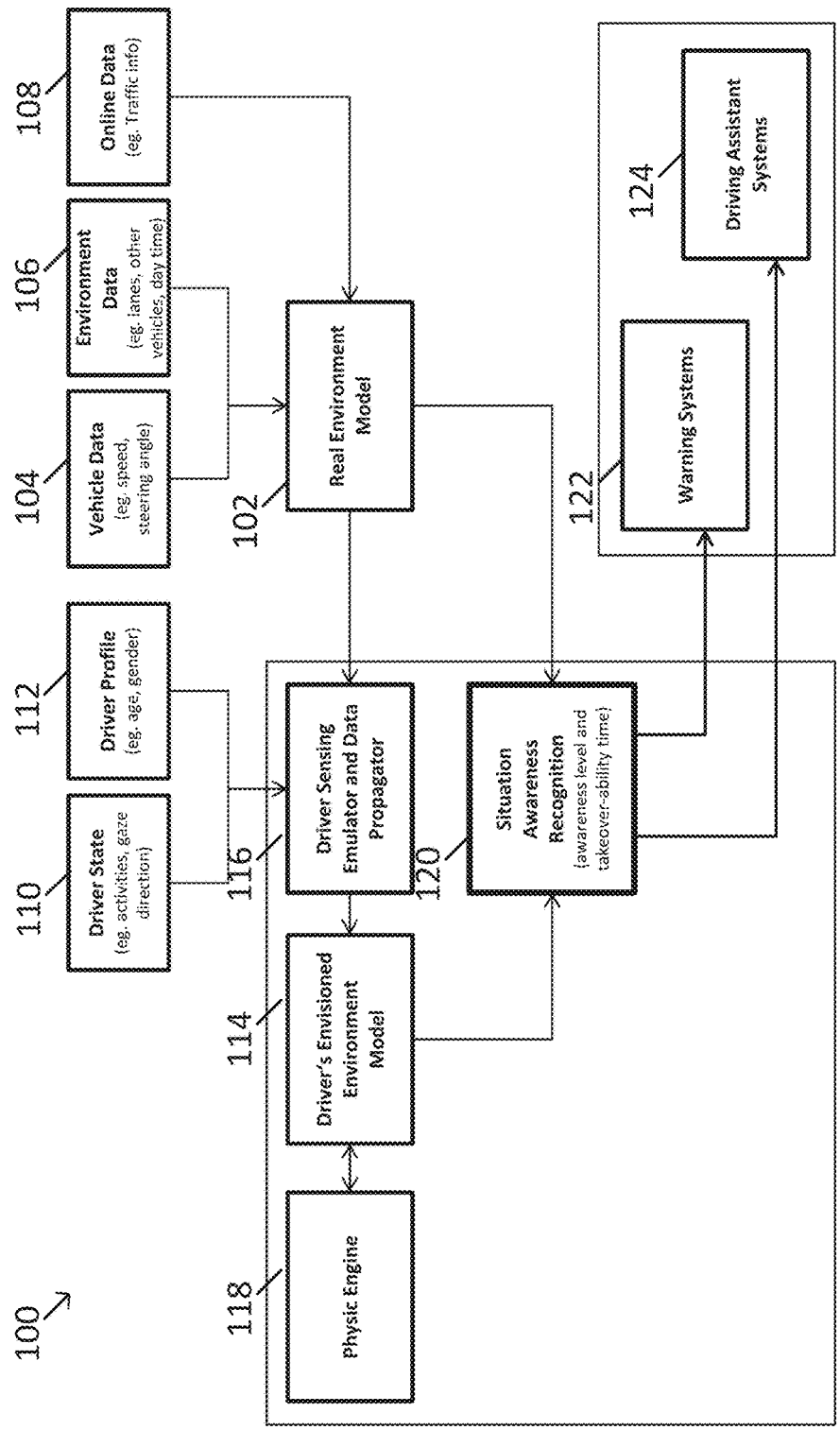
FIG. 1 is a diagram illustrating functional blocks of the context-aware driver monitoring system.

The illustration in the drawing is schematic. It is noted that in different figures, similar or identical elements are provided with the same reference signs or with reference signs which are different from the corresponding reference signs only within the first digit.

In particular, a system and/or a method are provided which may compute an envisioned environment model of a driver of a vehicle and/or may compare the envisioned environment model of the driver with a real environment model of the vehicle. In general, an environment model may be defined as the combination of all information which may specify an environment around a particular vehicle. This may include information such as lane marking, street borders, traffic signs, and/or position, speed and acceleration of other objects on and/or beside the road. Further, the environment model may be based on envisioned information, e.g. information which may be emulated and/or simulated, and/or real data, e.g. data which may be collected or captured by one or more sensor systems of the vehicle and/or data which may be provided by internal and/or external systems.

In particular, the real environment model may include one or more objects which have been identified by one or more sensor systems of the vehicle and/or data from internal and/or external systems. The envisioned environment model may include one or more objects of the real environment model from a driver's point of view, e.g. one or more objects of the real environment model which may have been sensed by the driver. The envisioned environment model may be continuously updated based on information that the driver of the vehicle may perceive from the real environment model via one or more senses of the driver, e.g. the hearing sense, the visual sense and/or the touching sense. Discrepancies or deviations of the envisioned environment model and the real environment model may lead to dangerous situations which may force the driver of the vehicle and/or systems of the vehicle to react. More specifically, large discrepancies or deviations of the envisioned environment model and the real environment model may indicate that the driver may have missed actions of other road users and/or that the driver may need an extended reaction time to capture via his senses changes of road users when taking over driving control. Depending on the discrepancies or deviations of the envisioned environment model and the real environment model, one or more factors may be calculated which may indicate the awareness of the driver in a particular situation and/or may indicate the time the driver may require to identify the current situation prior to taking over the driving responsibility. For example, a driving assistant system and/or a warning system of the vehicle may use the calculated factors to issue a signal to the driver to take over driving control.

FIG. 1 shows an overview of a context-aware driver monitoring system 100. The system may generate a real environment model 102. The real environment model 102 may include vehicle data 104, environment data 106, and/or online data 108. In particular, each object of the real environment model 102 may include data of the vehicle data 104, environment data 106 and/or online data 108. The vehicle data 104 may be data related to speed, steering angle, position, and/or acceleration of the vehicle. The environment data 106 may be data related to lanes of a road, other vehicles and/or day time. In particular, the environment data 106 may be data captured by one or more sensor systems of the vehicle when monitoring the surrounding of the vehicle. The environment data 106 may include speed, acceleration, and/or position of other vehicles in the surrounding of the vehicle. The online data 108 may include online traffic information.

Further, the system 100 may determine and/or receive a state of the driver 110. The state of the driver may include activities of the driver and/or a gaze direction of the driver. In general, the state of the driver 110 may include activities about what the driver is doing, where the driver is looking at and how strong are these activities influencing his driving abilities. In particular, the driving abilities may include one or more physical abilities of the driver. For example, the one or more physical abilities of the driver may be determined dependent on the age of the driver. For example, a reaction time of the driver may be determined based on the age of the driver. In general, the driving abilities of the driver may be predefined.

The system may also determine the driver profile 112. The driver profile 112 may include e.g. age, gender, and/or driving experience of the driver. For example, the driving experience may include the number of hours being driven by the vehicle, and/or the number of kilometers being driven by the vehicle. In order to generate the envisioned environment model 114 of the driver, the state of the driver 110 and/or the driver profile 112 may be used. For example, the state of the driver may include what the driver is doing, where he is looking at and how strong this is influencing him in his driving abilities. For example, a state of the driver may be that the driver has his eyes on the road, the driver has the hands on the steering wheel, and/or his head is oriented towards the road.

A driver sensing and data propagator module 116 may use the driver profile 112 and/or the driver state 110 to determine the envisioned environment model 114. In other words, the driver profile 112 and/or the driver state 110 may define the context for determining which of the one or more objects of the real environment model 102 may be recognized by the driver of the vehicle. Further, the driver sensing and data propagator module 116 may receive the one or more objects of the real environment model 102, the driver profile 112, and/or the driver state 110. The driver profile 112 and/or the driver state may be applied to each of the one or more objects of the real environment model 102 to determine the one or more objects of the real environment model which the driver may have envisioned. In other words, the driver state 110 and the driver profile 112 may be used to filter the one or more objects of the real environment model. Only those objects of the real environment model which a driver may have envisioned by at least one sense of the driver may be incorporated into the envisioned environment model 114. More specifically, if a particular object of the real environment model 102 does not exist in the envisioned environment model 114, the particular object may be added to the envisioned environment model 114. If a particular object of the real environment model exists in the envisioned environment model 114, the existing object of the envisioned environment model 114 may be overwritten by the particular object of the real environment model 102 and/or updated with new data of the particular object of the real environment model 102. By determining the one or more objects of the real environment model 102, the environment of the vehicle may be determined as it is envisioned by the driver.

Next, a physics engine 118 may be used to forecast changes of the one or more objects of the envisioned environment model 114. In particular, the physics engine may forecast position and/or speed of the one or more objects of the envisioned environment model 114 based on previously observed data of the one or more objects. Preferably, the previously observed data of the one more objects may be observed from the vehicle data 104, the environment data 106, and/or the online data 108 of the one or more objects of the real environment model 102. For example, the physics engine 118 may use the position and the speed of a particular object of the envisioned model to predict the position of the particular object in a time period in which the driver might not look at the particular object. In other words, the physics engine 118 may simulate the one or more objects of the envisioned model. The simulation of the physics engine 118 may provide a simulation of a prediction capacity of a human brain, in particular a simulation of the prediction capacity of a driver's brain. For example, the physics engine 118 may predict the velocity and/or the position of a particular object of the envisioned environment model 114, even if the particular object may have been seen only with a short glance by the driver of the vehicle. Further, the physics engine 118 may simulate the driver's senses, e.g. seeing, hearing, and/or touching, to provide predictions of how the one or more objects of the envisioned environment model 114 may change over time without receiving new or updated information from the real environment model 102.

The physics engine 118 may continuously update the one or more objects of the envisioned environment model 114. For example, the physics engine may update the one or more objects of the envisioned model each 10, 20, 30, 40, or 50 ms. For example, the physics engine may update the one or more objects as often as needed to provide accurate predictions of each of the one or more objects of the envisioned model. In particular, the physics engine 118 may overwrite the data of a particular object of the envisioned environment model 114 with the predicted data for the particular object of the envisioned environment model 114. By continuously updating the envisioned environment model 114 by the physics engine 118, a more accurate envisioned environment model 114 may be generated. Even if the driver is not receiving any new or updated data for the one or more objects of the envisioned environment model 114 from the real environment model 102, the context-aware driver monitoring system 100 may predict how the one or more objects of the envisioned environment model 114 may evolve.

Next, a situation awareness and take-over ability recognition module 120 may compare the envisioned environment model 102 with the real environment model 102. In particular, the one or more objects of the most recent envisioned environment model 114 may be compared to the one or more objects of the most recent real environment model 102. By comparing the envisioned environment model 114 and the real environment model 102, deviations or discrepancies for each object of the envisioned environment model 114 with each corresponding object of the real environment model may be computed. The computed deviations may be used to calculate a take-over ability time and/or a situation awareness factor. The take-over ability time may be specified as the estimated time required for a driver to take-over control of the vehicle. The situation awareness factor may be defined as an indicator indicating the deviation between the envisioned environment model and the real environment model. The calculated situation awareness factor and/or the calculated take-over-ability time may be sent to one or more warning systems 122 and/or one or more driving assistant systems 124 of the vehicle. By sending the situation awareness factor and/or the calculated take-over ability time to the one or more warning systems 122 and/or the one or more driving assistant systems 124, the warning and driving assistant systems may receive more reliable and precise information of the driver's awareness about the real environment. Advantageously, the warning and driving assistant systems may be able to react more reliably and more precisely to specific situations. More specifically, if the situation awareness factor indicates that the driver is still aware of the situation around the vehicle and/or the driver may take-over control in short time, e.g. a few seconds, the vehicle may drive a longer distance without forcing the driver to take-over control of the vehicle. In other words, the time which the driver may use for other non-driving activities may be increased. Additionally, the number and/or the intensity of warnings provided to the driver may be reduced.

Figure 2:
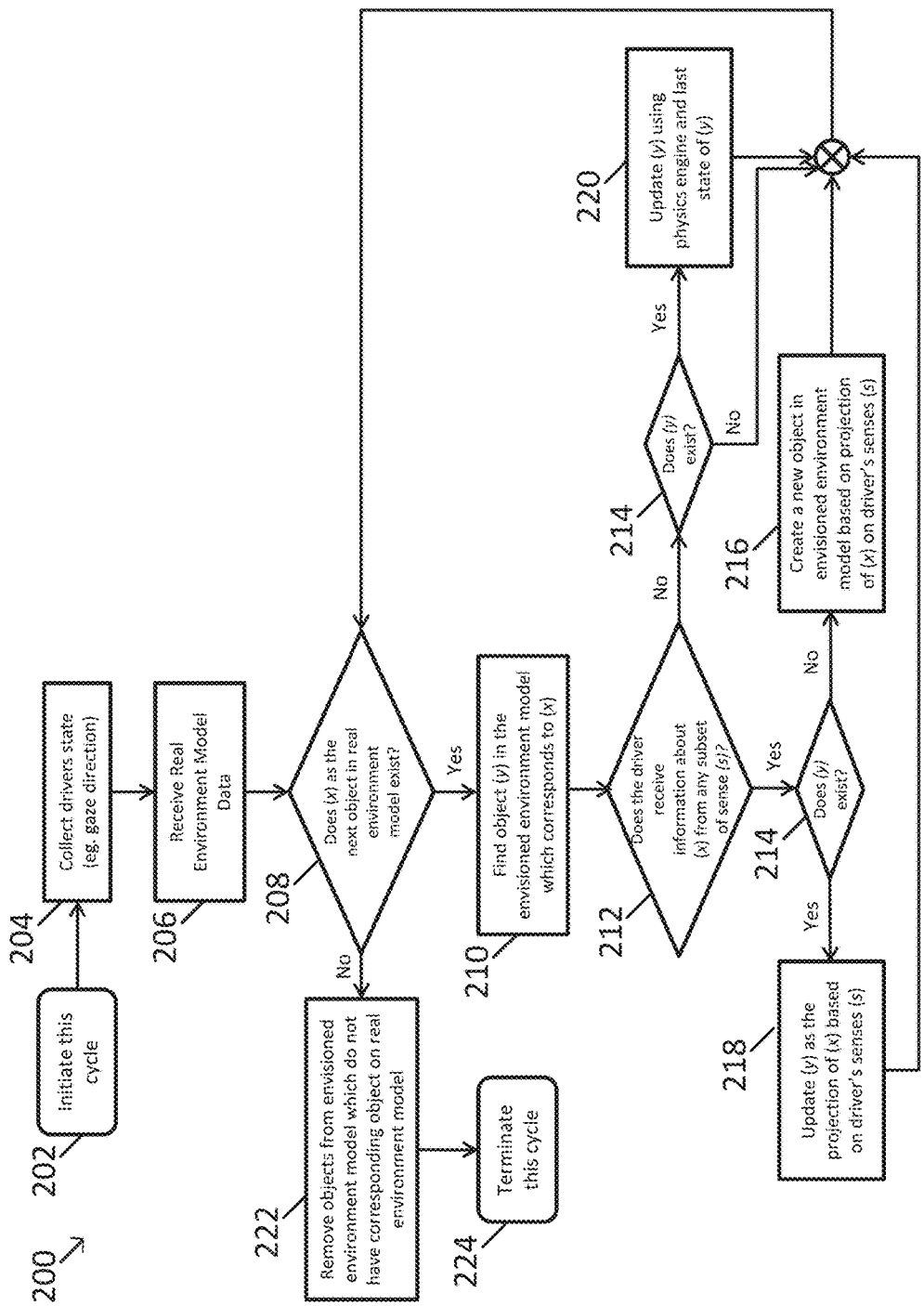
FIG. 2 illustrates a workflow of a driver sensing and data propagator module.

FIG. 2 shows a workflow 200 of a driver sensing and data propagator module 116. The driver sensing and data propagator module 116 may start processing at step 202. For example, the driver sensing and data propagator module 116 may start when receiving an event based on a pull or push design pattern. For example, the processing of the driver sensing and data propagator module 116 may be initiated periodically, e.g. each 50 ms. The driver sensing and data propagator module 116 may collect 204 the driver's state 110. For example, the driver sensing and data propagator module 116 may receive the gaze direction of the driver of the vehicle. Next, the driver sensing and data propagator module 116 may receive 206 data of the real environment model 102. For example, the real environment model 102 may include a list of vehicles around the ego-vehicle including their position and speed, and/or a road geometry including the number of lanes and the type of lane marking. In particular, the driver sensing and data propagator module 116 may receive 206 data of one or more objects of the real environment model 102 which may be captured using sensors and/or received from different data sources.

The driver sensing and data propagator module 116 may determine 208 whether a further object exists in the real environment model which has not been processed. If it is determined that a further object exists in the real environment model 102, the driver sensing and data propagator module 116 may search 210 a corresponding object in the envisioned environment model 114. For example, the further object may be searched according to an identifier in the real environment model 102.

Further, the driver sensing and data propagator module 116 may determine whether the driver may receive information about a particular object of the real environment model 102 via at least one sense or a subset of senses, e.g. a visual sense, a hearing sense, and/or a touching sense. For example, the following properties or constraints may be specified for the vision sense:

The object should be in the range of the eye sight power of the driver.

The eyes of the driver should be looking towards the object.

The eyes of the driver should be open.

No object should stand in the line of sight between the driver and the target object.

The driver should keep the object for a given period of time within the driver's view cone, e.g. a few hundred milliseconds.

Next, it may be determined whether the search 210 may have found the corresponding object in the envisioned model 114. In other words, it may be checked whether the corresponding object exists 214 in the envisioned model 114.

If it is determined that the driver receives information about a particular object from a subset of the senses of the driver and it is determined that no corresponding object in the envisioned environment model 114 exists, a new object may be created 216 in the envisioned environment model 114. In particular, only data of the particular object of the real environment model 102 may be used for creating 216 the new object in the envisioned environment model 114 which may be received by the subset of senses of the driver. In other words, the new object may be created 216 in the envisioned environment based on a projection of the particular object on the senses of the driver. A projection may create a corresponding object in the envisioned environment model 114 based on the information that the driver may have really observed. For example, for each object representing a vehicle in the real environment model 102, a dummy vehicle in the envisioned environment model 114 may be created including values such as position, orientation, speed and/or acceleration. The driver may observe the position of the object in a short time frame. However, the driver may require more time for observing the acceleration of the objects. Hence, when a particular object is only observed for a short period of time, only the position of the object may be mapped to the corresponding dummy object of the envisioned environment model 114. When the driver has been looking for a longer time at the object, the speed and the acceleration of a particular object may be observed by the driver. Accordingly, the speed and the acceleration data of the particular object of the real environment model may be incorporated into the corresponding object of the envisioned environment model. After creating 216 the new object in the envisioned environment model 114, the driver sensing emulator and data propagator module 200 may continue determining 208 whether a further object exists in the real environment model 102 which has not been processed.

If it is determined that the driver receives information about a particular object from a subset of the senses of the driver and it is determined that a corresponding object exists in the envisioned environment model 114, the existing object of the envisioned environment model may be updated 218 as the projection of the particular object of the real environment model based on the subset of the senses of the driver. In other words, only data of corresponding object may be updated 218 for which a driver has received information via the subset of senses of the driver. For example, when the driver has not been looking at a particular vehicle for a certain amount of time and the particular vehicle has changed its speed, the speed of the corresponding object in the envisioned environment model may be updated when the driver looks at the particular object next time. Any other information might not be updated 218 by the particular object of the real environment model 102. After updating 218 the existing object of the envisioned environment model 114, the driver sensing emulator and data propagator module 200 may continue determining 208 whether a further object exists in the real environment model 102 which has not been processed.

If the driver does not receive information about a particular object of the real environment model 102 from a subset of senses of the driver and a corresponding object exists in the envisioned environment model 114, the corresponding object may be updated 220 using the physics engine 118 and the data of the corresponding objection of the envisioned environment model. For example, when the driver looks to a particular object, the position and the speed of the object may be incorporated into the envisioned environment model. When the driver looks away from the object later, the physics engine 118 may modify the position of the object based the speed of the object in the envisioned environment model 114. For example, the state of each object, e.g. the location, the speed, and/or the acceleration of a vehicle, may be updated by the physics engine 118 if the driver sensing emulator and data propagator determines that the driver does not receive new information from the real environment.

After updating 218 the existing object of the envisioned environment model 114, the driver sensing emulator and data propagator module 200 may continue determining 208 whether a further object exists in the real environment model 102 which has not been processed.

If the driver does not receive information about a particular object of the real environment model 102 from a subset of senses of the driver and a corresponding object does not exist in the envisioned environment model 114, the driver sensing emulator and data propagator module 200 may continue determining 208 whether a further object exists in the real environment model 102 which has not been processed. In other words, the driver sensing emulator and data propagator module 200 may ignore the particular object of the real environment data, since the particular object might not be sensed by the driver.

If all objects of the real environment model are processed by the driver sensing emulator and data propagator module 200 and one or more additional objects exist in the envisioned environment model, the one or more additional objects may be removed 222 from the envisioned environment model 114. In other words, one or more objects of the envisioned environment model 114 may be removed which do not have corresponding objects in the real environment model 102. For example, if a vehicle close to the vehicle of the driver has left the road, this vehicle might not be included as an object in the real environment model any more. Accordingly, this object may be removed 222 from the envisioned environment model, since this object might not be relevant for the driver any more. After removing 222 the one or more objects from the envisioned environment model, the processing may terminate 224.

The process as depicted in FIG. 2 may be executed periodically. In particular, the process may be executed periodically by the driver sensing emulator and data propagator module 200 and/or the physics engine 118. In each period or cycle, the envisioned environment model may be updated based on the real environment model 102 and/or an output of the physics engine 118. In other words, the envisioned environment model may be updated by actual information the driver has received via his senses from the real environment and/or by information which the physics engine has computed based on previous information the driver has received via his senses from the real environment.

Advantageously, the driver of a vehicle may be enabled to focus on non-driving activities for longer periods. More specifically, the driver may focus on non-driving activities as long as there is no significant deviation between the real environment model and the envisioned environment model. Further, the hands-off driving time may be extended using the driving assistant systems. A warning regarding a dangerous situation may be issued only if the perception as indicated by the envisioned environment model and the reality as indicated by the real environment model differ significantly. Furthermore, warnings which may be redundant, unnecessary or annoying for the driver may be reduced. The one or more driving assistant systems of the vehicle may drive the vehicle autonomously for a longer time without disturbing the driver with one or more warnings. In addition, all senses of the driver may be considered when determining the envisioned environment model. Thus, a more complex model of the driver's perception of the reality may be created.

Moreover, the workflow as depicted in FIG. 2 may consider the ability of the driver to memorize and build a 3D model of the outside world in his mind. In other words, the method may consider the ability of the driver to forecast the behavior of an object even with a short previous glance.

Figure 3:
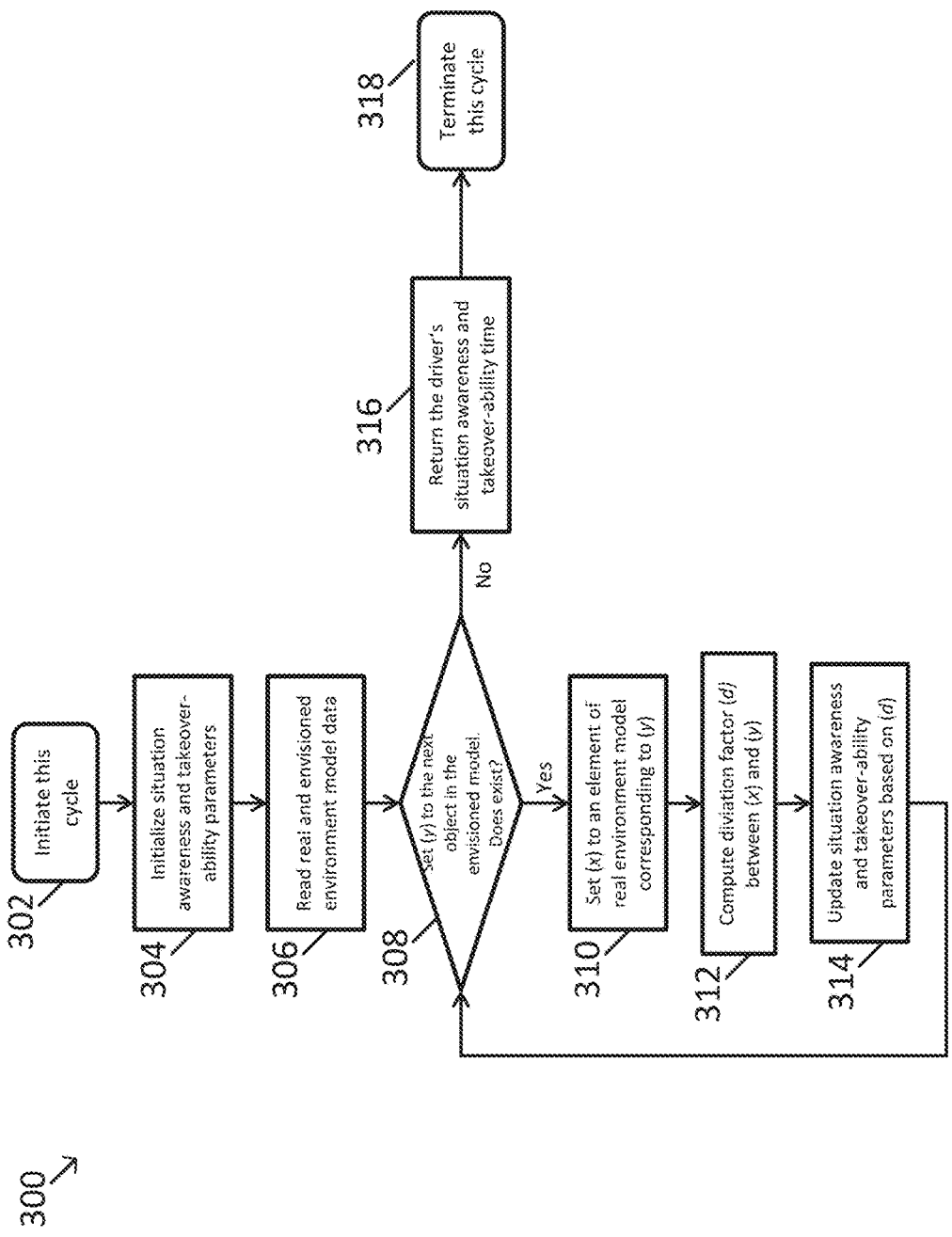
FIG. 3 illustrates a workflow of a situation awareness and takeover-ability recognition module.

FIG. 3 shows a workflow of a situation awareness and takeover-ability recognition module 120. The method 300 may be initiated 302 when the driver sensing emulator and data propagator 116 and the physics engine 118 may have terminated updating the envisioned environment model. At 304, a situation awareness factor and a takeover-ability time may be initialized. For example, the situation awareness factor and the takeover-ability time may be initialized to a predefined value. Next, the situation awareness and takeover-ability recognition module 120 may read 306 the real environment model 102 and the envisioned environment model 114.

Further, it is determined 308 whether an object which has not been processed exists in the envisioned environment model 114. If an object which has not been processed exists in the envisioned environment model 114, the corresponding object in the real environment model 102 may be determined 310.

Next, a deviation factor may be computed 312 between the object of the envisioned environment model 114 and the corresponding object of the real environment model. In particular by calculating the deviation factor discrepancies between the objects of the models are calculated. In particular, the deviation factor d may be calculated as:

$$d_{O-O'} = |x_O - x_{O'}| \cdot w_{pos} + |v_O - v_{O'}| \cdot w_{vel} + |a_O - a_{O'}| \cdot w_{acc}$$

where x may describe the position, v the velocity, a the acceleration and/or w the weight of the terms. The weight of the terms may be different for different objects in different situations.

Based on the computed deviation factor for each pair of objects in the envisioned environment model 114 and the real environment model 102, the takeover-ability time and the situation awareness factor may be calculated. In particular, the situation awareness factor and the take-over ability time may be updated 314 based on a particular deviation factor for a particular pair of objects of the envisioned environment model 114 and the real environment model 102. For example, updating 314 the situation awareness factor and the take-over ability time may include recalculating the situation awareness factor and the take-over ability time based on the particular deviation factor for the particular pair of objects.

The situation awareness factor S may be calculated by adding the weighted deviation factors and by inverting them such that S≈0 corresponds to an unaware driver and a high value of S means that the driver is aware of his surroundings. In particular, the situation awareness S may be calculated as:

$$S = \frac{1}{\sum_{i=1}^{N} W_i d_{O_i - O'_i}}$$

wherein N may be the number of objects and W_i the weights of the deviation factors. The weights of the deviation factors may depend on the situation and the objects. For example, objects on the same lane or aligned on the trajectory of the ego vehicle may be more important than objects on another lane.

The takeover-ability time T may be calculated as:

$$T = \frac{1}{S} * \alpha + \beta,$$

where S may be the situation awareness factor, α may be a ratio for mapping a relative time to a real time, and β may be a constant value. In particular, the takeover-ability time may be calculated as a product of the reverse of the situation awareness factor and a predefined constant ratio α. The reverse of the situation awareness factor may increase when the driver is less aware of the objects of the real environment and may decrease when the driver is aware of the objects of the real environment. The constant β may be always added to the takeover-ability time so that safety regulations, e.g. safety regulations of the automotive industry for driverless driving, may be always met.

If all objects in the envisioned environment model 114 have been processed, i.e. no further object has been determined in the envisioned model 114, the situation awareness factor and the take-over ability time may be provided 316 to the one or more warning systems 122 and/or the one or more driving assistant systems 124. Next, the situation awareness and take-over ability time recognition module may terminate 318.

Advantageously, one or more systems of the vehicle, e.g. the one or more warning systems and/or the one or more driving assistant systems, may receive a take-over ability time, re, an estimation of the time needed for a distracted driver to take back the control. Therefore, the one or more warning systems and the one or more driving assistance system may dynamically adapt to the driver's situation. The systems may provide more precise feedback to the driver so that the driver may relax while the vehicle is driving autonomously.

Figure 4D:
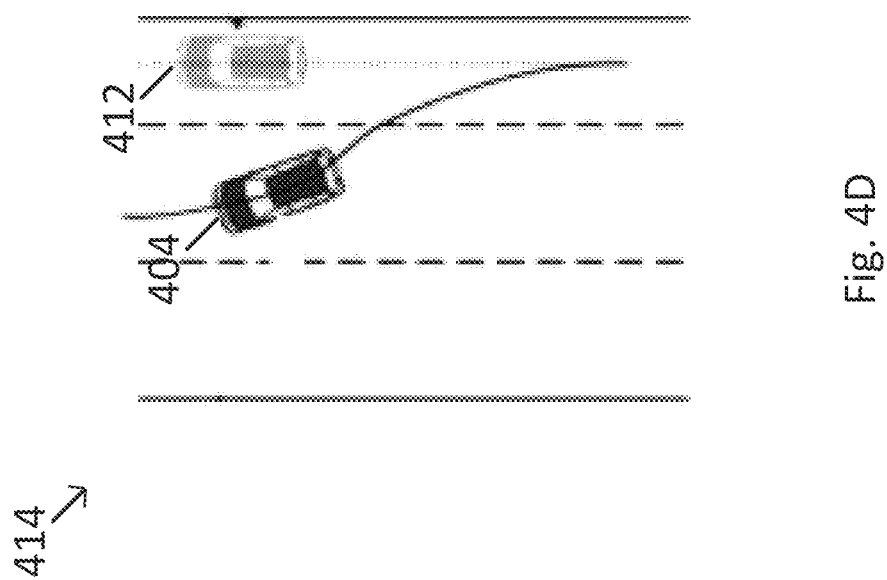
FIG. 4D shows an exemplary situation of a large deviation of the driver model and the real world model.

FIGS. 4A to 4D show an exemplary situation on a road and a simplified processing of the context-aware driver monitoring system 100. FIG. 4A shows an exemplary real environment model of a simplified situation 400 on a road at four different times t1, t2, t3, and t4. As depicted in FIG. 4A, a vehicle 402 having the context-aware driver monitoring system 100 and a further vehicle 404 may drive at times t1 and t2 on neighboring lanes slightly displaced to each other. The vehicle 404 on the right lane may change to the middle lane at time t3. To avoid a collision, the vehicle 402 on the middle lane may decelerate such that both vehicles, the vehicle 402 and the vehicle 404, may drive after each other in the middle lane at time t4. More specifically, the context-aware driver monitoring system 100 of the vehicle 402 may generate a real environment model 102 at time t1 comprising a single object regarding the vehicle 404 and updates of the single object at times t2 to t4. The single object of the real environment model 102 may be generated and/or updated using the vehicle data 104, the environment data 106, and/or the online data 108.

FIG. 4B shows an exemplary envisioned environment model 406 when the driver is observing the road. As illustrated by the viewing field 408 of the vehicle 402, the gaze direction of the driver is directed to the front window of the vehicle 402. The driver sensing emulator and data propagator 116 may apply, at each time t1 to t4, the process of FIG. 2 to generate and/or update the objects of the envisioned environment model 114. Since there is only a single object in the real environment model 102 and the state of the driver indicates that the driver is receiving information about the single object via the visual sense of the driver, the envisioned environment model 114 may comprise the single object of he real environment model 102 and the same data of the single object of the real environment model 102. In other words, the envisioned environment model 114 is in agreement with the real environment model 102.

FIG. 4C shows an exemplary envisioned environment model 410 when the driver is looking to the road only at time t1. For example, the driver may see at time t1 that the vehicle 404 may keep driving straight forward with essentially the same speed. At time t1, the envisioned environment model 114 may be in agreement with the real environment model 102. At times t2 to t4, the envisioned environment model 114 might not receive any new information from the real environment model 102 and the envisioned environment model 114 may be updated only with the physics engine 118 based on the previous information as received at time t1. More specifically, the vehicle 402 of the envisioned environment model 114 may be in agreement with the corresponding object of the real environment model 102. However, the vehicle 404 may be simulated at times t2 to t4 by the physics engine 118 as indicated by reference number 412. In other words, the vehicle 412 may correspond to vehicle 404 but the data of vehicle 412 may be simulated by the physics engine 118. Thus, a dangerous deviation between the e envisioned environment model 114 at time t4 and the real environment model at time t4 may exist.

FIG. 4D illustrates the deviation 414 of the envisioned environment as depicted in FIG. 4C and the real environment model as depicted in FIG. 4A. In particular, the simulated data of vehicle 412 may deviate from the captured data of vehicle 404. As illustrated in FIG. 4D, the simulated data of vehicle 412 may assume that vehicle 404 is located in the right lane. However, the captured data of vehicle 404 may indicate that vehicle 404 is changing lane from the right lane to the middle lane. The deviation 414 may be calculated by the situation awareness and take-over ability recognition module 120 using the process as shown in FIG. 3. The resulting situation awareness factor and/or the take-over ability time may be provided to a warning system and/or a driving assistant system of the vehicle. For example, the warning system may provide a warning to the driver to look through the front window of the vehicle and/or the driving assistant system may adapt the speed of the vehicle 402 and/or force the driver to take-over control based on the received situation awareness factor and/or the take-over ability time. Thus, the warning system and/or the driving assistant system may efficiently provide the correct warnings to the driver.

it should be noted that the term "comprising" does not exclude other elements or steps and the use of articles "a" or "an" does not exclude a plurality. Also elements described in association with different embodiments may be combined. It should also be noted that reference signs in the claims should not be construed as limiting the scope of the claims.

LIST OF REFERENCE SIGNS

100 context-aware driver monitoring system
102 real environment model
104 vehicle data
106 environment data
108 online data.
110 driver state
112 driver profile
114 envisioned environment model
116 driver sensing emulator and data propagator
118 physics engine
120 situation awareness and take-over ability recognition module
122 warning systems
124 driving assistant systems
200 workflow of a driver sensing and data propagator module
202 start of processing
204 collect driver's state
206 receive data of real environment model
208 determine whether a further object exists in the real environment model which has not been processed
210 search a corresponding object in the envisioned environment model
212 determine whether the driver may receive information about a particular object of the real environment model
214 check whether the corresponding object exists in the envisioned environment model
216 create a new object in the envisioned environment model
218 update an existing object in the envisioned environment model
220 update an existing object in the envisioned environment model by the physics engine
222 remove object from the envisioned environment model
224 terminate processing
300 workflow of a situation awareness and take-over ability recognition module
302 initiate processing
304 initialize situation awareness factor and take-over ability time
306 read data from the envisioned environment model and the real environment model
308 determine whether a non-processed object exists in the envisioned environment model
310 determine a corresponding object of the real environment model to a particular object of the envisioned environment model
312 compute a deviation factor
314 update the situation awareness factor and the take-over ability time
316 return the situation awareness factor and the take-over ability time
318 terminate processing
400 simplified situation on a road
402 vehicle
404 vehicle
406 exemplary envisioned environment model
408 viewing field of a driver
410 exemplary envisioned environment model
412 simulated vehicle
414 exemplary deviation of the envisioned environment model and the real environment model The foregoing disclosure has been set forth merely to illustrate the invention and is not intended to be limiting. Since modifications of the disclosed embodiments incorporating the spirit and substance of the invention may occur to persons skilled in the art, the invention should be construed to include everything within the scope of the appended claims and equivalents thereof.

What is claimed is:

1. A method for monitoring a driver of a vehicle, the method comprising the acts of:

receiving a state of the driver;

receiving one or more objects of a real environment model of the vehicle;

generating one or more objects of an envisioned environment model of the driver based on the one or more objects of the real environment model of the vehicle and the state of the driver, wherein, if the state of the driver indicates that at least one sense of the driver sensed a particular object of the real environment model, the particular object of the real environment model is added to the envisioned environment model;

updating the one or more objects of the envisioned environment model based on the state of the driver, wherein the one or more objects of the envisioned environment model are updated by a physics engine if the state of the driver indicates that the driver is prevented from sensing the one or more objects of the real environment model;

computing a deviation factor between the particular object of the real environment model and the corresponding object of the envisioned environment model;

calculating a situation awareness factor based on the deviation factor for the particular object of the real environment model and the corresponding object of the envisioned environment model; and calculating a take-over ability time based on a function of the situation awareness factor.

2. The method according to claim 1, wherein the generating of the one or more objects of the envisioned environment model further comprises the acts of:
finding a corresponding object of the particular object in the envisioned environment model;
determining whether the driver of the vehicle has received information about the particular object via a subset of senses of the driver, the subset of senses being determined based on the state of the driver;
updating the corresponding object of the envisioned environment model with data of the particular object based on the subset of senses, if the corresponding object exists in the envisioned environment model and the driver has received information about the particular object via the subset of senses.

3. The method according to claim 1, wherein the deviation factor comprises a deviation of at least one of position, speed, and acceleration between the particular object of the real environment model and the corresponding object of the envisioned environment model.

4. The method according to claim 3, wherein the deviation of the position comprises a weighted deviation of the position, wherein the deviation of the speed comprises a weighted deviation of the speed, and/or wherein the deviation of the acceleration comprises a weighted deviation of the acceleration.

5. The method according to claim 1, the method further comprising the act of:
providing the calculated situation awareness factor and/or the calculated take-over ability time to at least one of a warning system and a driving assistant system of the vehicle so that the warning system and/or the driving assistant system may adapt to a new situation as indicated by the calculated situation awareness factor and/or the calculated take-over ability time.

6. A system for monitoring a driver of a vehicle, the system comprising:
a processor,
a memory,
instructions stored within the memory, wherein the instructions, when executed on the processor, cause the system to:
receive a state of the driver;
receive one or more objects of a real environment model of the vehicle;
generate one or more objects of an envisioned environment model of the driver based on the one or more objects of the real environment model of the vehicle and the state of the driver, wherein, if the state of the driver indicates that at least one sense of the driver sensed a particular object of the real environment model, the particular object of the real environment model is added to the envisioned environment model;
update the one or more objects of the envisioned environment model based on the state of the driver, wherein the one or more objects of the envisioned environment model are updated by a physics engine if the state of the driver indicates that the driver is prevented from sensing the one or more objects of the real environment model;
compute a deviation factor between the particular object of the real environment model and the corresponding object of the envisioned environment model;
calculate a situation awareness factor based on the deviation factor for the particular object of the real environment model and the corresponding object of the envisioned environment model; and
calculate a take-over ability time based on a function of the situation awareness factor.

7. The system according to claim 6, wherein the instructions that generate the one or more objects of the envisioned environment model further comprise instructions which, when executed, cause the system to:
find a corresponding object of the particular object in the envisioned environment model;
determine whether the driver of the vehicle has received information about the particular object via a subset of senses of the driver, the subset of senses being determined based on the state of the driver;
update the corresponding object of the envisioned environment model with data of the particular object based on the subset of senses, if the corresponding object exists in the envisioned environment model and the driver has received information about the particular object via the subset of senses.

8. The system according to claim 6, wherein the deviation factor comprises a deviation of at least one of position, speed, and acceleration between the particular object of the real environment model and the corresponding object of the envisioned environment model.

9. The system according to claim 8, wherein the deviation of the position comprises a weighted deviation of the position, wherein the deviation of the speed comprises a weighted deviation of the speed, and/or wherein the deviation of the acceleration comprises a weighted deviation of the acceleration.

10. A computer product for monitoring a driver of a vehicle, the computer product comprising a non-transitory computer readable medium having stored thereon program instructions that:
receive a state of the driver;
receive one or more objects of a real environment model of the vehicle;
generate one or more objects of an envisioned environment model of the driver based on the one or more objects of the real environment model of the vehicle and the state of the driver, wherein, if the state of the driver indicates that at least one sense of the driver sensed a particular object of the real environment model, the particular object of the real environment model is added to the envisioned environment model; and
update the one or more objects of the envisioned environment model based on the state of the driver, wherein the one or more objects of the envisioned environment model are updated by a physics engine if the state of the driver indicates that the driver is prevented from sensing the one or more objects of the real environment model;
compute a deviation factor between the particular object of the real environment model and the corresponding object of the envisioned environment model;
calculate a situation awareness factor based on the deviation factor for the particular object of the real environment model and the corresponding object of the envisioned environment model; and
calculate a take-over ability time based on a function of the situation awareness factor.

11. The computer product according to claim 10, further comprising, for generating the one or more objects of an envisioned environment model, program instructions that:
find a corresponding object of the particular object in the envisioned environment model;

determine whether the driver of the vehicle has received information about the particular object via a subset of senses of the driver, the subset of senses being determined based on the state of the driver;

update the corresponding object of the envisioned environment model with data of the particular object based on the subset of senses, if the corresponding object exists in the envisioned environment model and the driver has received information about the particular object via the subset of senses.

* * * * *